United States Patent
Levchenko

(10) Patent No.: US 9,740,865 B2
(45) Date of Patent: Aug. 22, 2017

(54) SYSTEM AND METHOD FOR CONFIGURING ANTIVIRUS SCANS

(71) Applicant: AO Kaspersky Lab, Moscow (RU)

(72) Inventor: Vyacheslav I. Levchenko, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 15/062,758

(22) Filed: Mar. 7, 2016

(65) Prior Publication Data

US 2017/0091455 A1    Mar. 30, 2017

(30) Foreign Application Priority Data

Sep. 30, 2015  (RU) ................................ 2015141542

(51) Int. Cl.
| | |
|---|---|
| *G06F 21/00* | (2013.01) |
| *G06F 21/56* | (2013.01) |
| *G06F 21/62* | (2013.01) |
| *G06F 21/57* | (2013.01) |

(52) U.S. Cl.
CPC .......... *G06F 21/566* (2013.01); *G06F 21/577* (2013.01); *G06F 21/6218* (2013.01)

(58) Field of Classification Search
CPC ............................. H04L 63/145; G06F 21/566
See application file for complete search history.

(56) References Cited

U.S. PATENT DOCUMENTS

| | | | |
|---|---|---|---|
| 6,763,466 B1 * | 7/2004 | Glover .................... | G06F 21/56 713/188 |
| 7,523,487 B2 * | 4/2009 | Muhlestein ........... | G06F 21/562 713/155 |
| 7,765,410 B2 * | 7/2010 | Costea ................... | G06F 21/56 713/164 |
| 8,122,507 B1 | 2/2012 | Andruss et al. | |
| 8,443,445 B1 | 5/2013 | Andruss et al. | |
| 8,650,650 B1 * | 2/2014 | Pavlyushchik ....... | G06F 21/562 726/22 |
| 8,910,288 B2 * | 12/2014 | Young ........................... | 713/189 |
| 2003/0110391 A1 * | 6/2003 | Wolff .................... | G06F 21/567 726/22 |
| 2006/0294589 A1 * | 12/2006 | Achanta ................ | G06F 21/564 726/24 |

(Continued)

*Primary Examiner* — Morshed Mehedi
(74) *Attorney, Agent, or Firm* — Michael Fainberg; Arent Fox LLP

(57) ABSTRACT

Disclosed are systems and method for configuring antivirus scans on a computer. An example method comprising: identifying, by a hardware processor, a software object that requires an antivirus scan; collecting, by the hardware processor, information for setting antivirus scan of the object; accessing, by the hardware processor, a data store of antivirus setting rules; selecting, by the hardware processor, a date and time for the start of the antivirus scan of the object based on the collected information and one or more antivirus setting rules; selecting, by the hardware processor, an antivirus scan method based on the collected information, the selected date and time, and one or more antivirus setting rules; and performing, by the hardware processor, an antivirus scan of the object using the selected antivirus scan method and at the selected date and time.

20 Claims, 5 Drawing Sheets

(56) References Cited

U.S. PATENT DOCUMENTS

| | | | |
|---|---|---|---|
| 2008/0263658 A1* | 10/2008 | Michael | G06F 21/562 726/22 |
| 2009/0094698 A1 | 4/2009 | Nichols et al. | |
| 2009/0307776 A1* | 12/2009 | Curnyn | G06F 21/566 726/24 |
| 2010/0324945 A1* | 12/2010 | Hessing | G06Q 40/08 705/4 |
| 2011/0219451 A1* | 9/2011 | McDougal | G06F 21/562 726/23 |
| 2012/0005756 A1* | 1/2012 | Hoefelmeyer | H04L 63/1425 726/24 |
| 2012/0036571 A1* | 2/2012 | Yoo | G06F 21/567 726/13 |
| 2012/0110667 A1* | 5/2012 | Zubrilin | G06F 21/56 726/24 |
| 2014/0007239 A1* | 1/2014 | Sharpe | G06F 21/561 726/24 |
| 2015/0020203 A1* | 1/2015 | Xie | G06F 21/56 726/24 |

* cited by examiner

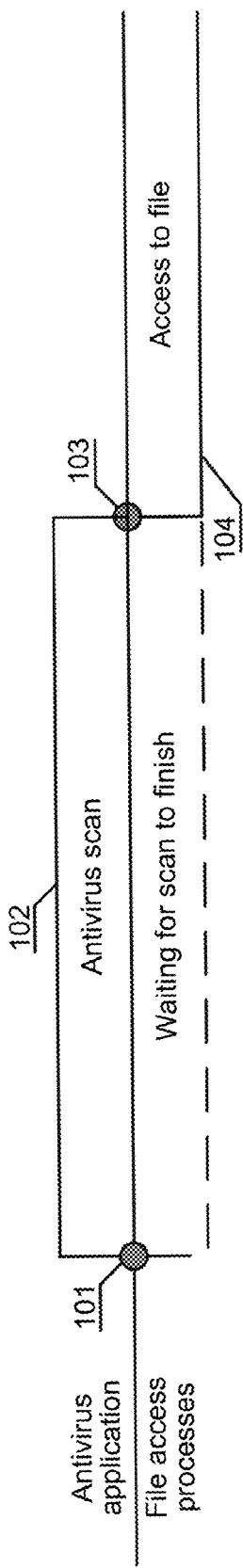
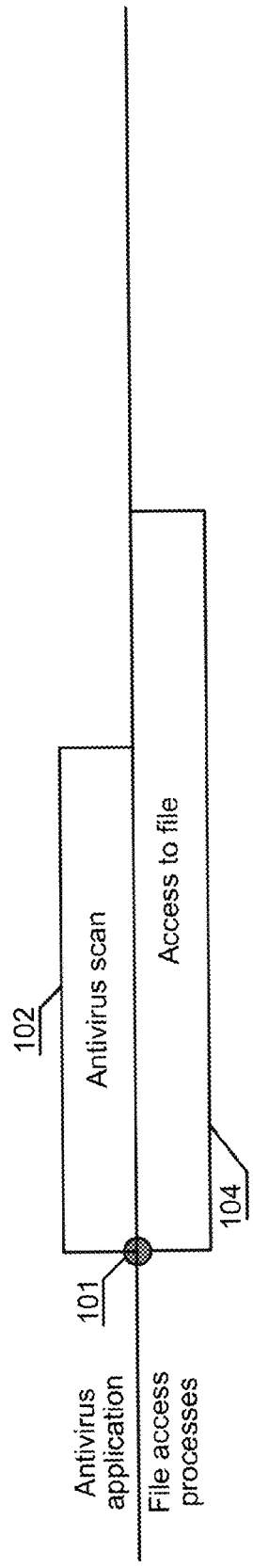

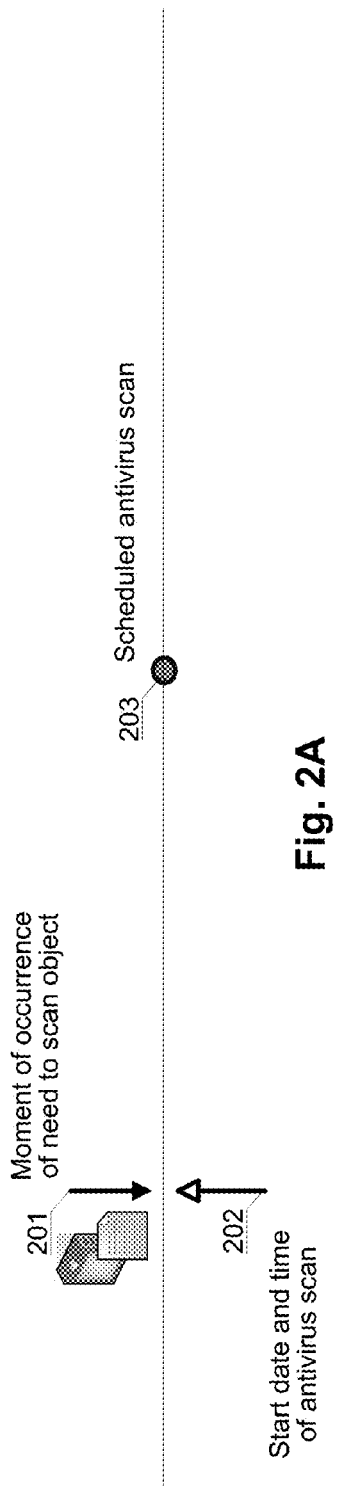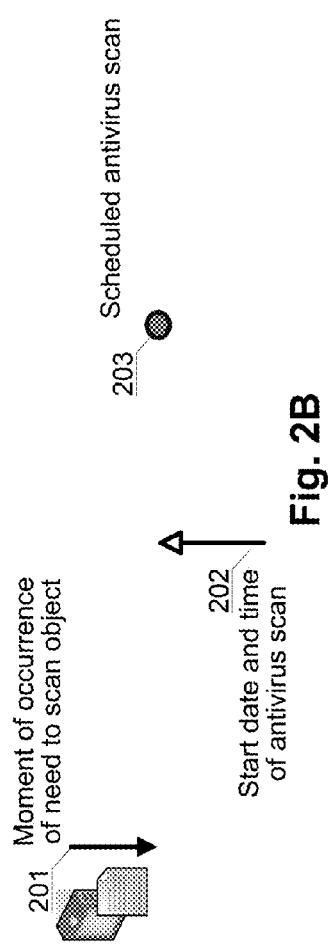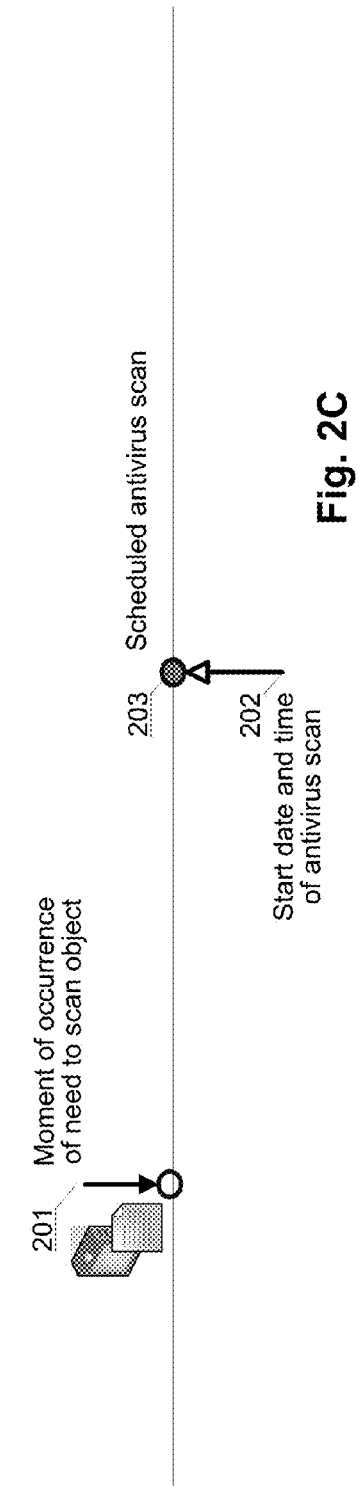

SYSTEM AND METHOD FOR CONFIGURING ANTIVIRUS SCANS

The present disclosure claims benefit of priority under 35 U.S.C. 119(a)-(d) to a Russian Application No. 2015141542 filed on Sep. 30, 2015, which is incorporated by reference herein.

FIELD OF TECHNOLOGY

The present invention relates generally to the field of computer security, and, more specifically, to systems and methods for configuring antivirus scans on a computer.

BACKGROUND

The number of malicious programs is constantly increasing. Internet worms, Trojan horses, computer viruses and other malicious programs (commonly known as malware) are causing great harm to users and companies. One of the most effective ways of counteracting malware is using antivirus software, which detects and removes malicious programs from a computer. For the detection of malicious programs, the antivirus software may perform a complete or selective checking of the files present on the hard drives and network drives.

For detection of malware, the antivirus software may perform synchronous and asynchronous scanning of files on the computer. In the synchronous mode, when a file access attempt occurs all actions by other programs on the file being scanned are blocked at the driver level by the antivirus software until such time when the scan is complete. The blocking of the files also allows the execution of malicious code from the file to be prevented and enables a timely isolation of a malicious program. Asynchronous file scanning is typically used in those cases where the threat of execution of malicious code during access to a file is minimal and there is no need for blocking of files. In the asynchronous mode, there is no blocking upon access to the file, and the file itself is scanned in parallel with other actions on the file.

The differences between synchronous and asynchronous file scanning modes are shown in greater detail in FIG. 1A and FIG. 1B. FIG. 1A shows the order of interaction with a file by processes requesting access to the file, and by the antivirus program during a synchronous scan. At time 101, the antivirus program receives a command to scan a particular file. This command may be triggered, for example, by an attempt of the user to open the indicated file. In the case of the synchronous mode of scanning, any processes for access to the file are stopped for the period of time 102, during which the antivirus program is scanning the file for malicious content. As an example of an access process is the process of the text editor Microsoft Word, which waits until completion of the antivirus scanning of the document file before proceeding to open it. The process requesting access may only obtain access to the file during step 104, after the antivirus program completes the scan of the file at time 103.

FIG. 1B shows the order of interaction with a file by access processes and an antivirus program during an asynchronous scan. At time 101, the antivirus program receives a command to scan a particular file. In the case of the asynchronous mode, any given access processes continue working with the file in step 104. The antivirus program begins to scan the file at time 102 in parallel, independently of the actions of other applications on the file.

Periodically situations arise when repeated scans of files are required, for example, when a previously unknown malicious application infects user's computer. During the first scan, which the antivirus program always performs in synchronous mode for unknown applications, the harmfulness might not be verified. In this case, the malicious application will be given permission to start running. After a certain time, antivirus libraries containing information about this malicious application are updated. In order to detect such a case, which is encountered more and more frequently in recent times, all recently detected files should be scanned each time when the antivirus libraries are updated.

After the update of the antivirus libraries, the applications scanned may be considered to be unknown. But in this case, when performing the repeat scan the synchronous mode is not justified, as it may decrease the speed or performance of the device. Therefore, it makes sense to perform an asynchronous scan. Different solutions exist for configuring synchronous and asynchronous antivirus scans and assessing their effect on system performance. However, one common drawback of known solutions is the inability to determine the size and the content of the antivirus libraries, which will be used in the antivirus scan.

SUMMARY

Disclosed are systems and method for configuring antivirus scans on a computer. In one exemplary aspect, a method for configuring antivirus scans comprises: identifying a software object that requires an antivirus scan; collecting information for setting antivirus scan of the object; accessing a data store of antivirus setting rules; selecting a date and time for the start of the antivirus scan of the object based on the collected information and one or more antivirus setting rules; selecting an antivirus scan method based on the collected information, the selected date and time, and one or more antivirus setting rules; and performing an antivirus scan of the object using the selected antivirus scan method and at the selected date and time.

In one exemplary aspect, identifying an object that requires an antivirus scan includes identifying one or more of: an object to which an attempt to access was detected; an object that was created or modified; an object which was already subject to an antivirus scan; an object associated with one or more system events characteristic of malicious software; an object associated with an update antivirus records; an object associated with known software vulnerabilities; and an object that was selected for antivirus scanning by a user.

In one exemplary aspect, collecting information for setting antivirus scan of the object includes collecting information about one or more of: format of the object; checksum of the object; date and time of creation of the object; date and time of last modification of the object; type of threats associated with that format of the object; presence of vulnerabilities associated with the format of the object; quantity of infected files of the format of the object; presence of digital signature of the object; and date and time of last compilation of the object.

In one exemplary aspect, when the object requiring antivirus scan was already subject to an antivirus scan, then collecting information for setting antivirus scan of the object includes collecting information about one or more of: date and time of the last antivirus scan of the object; date and time of the last update of the antivirus records database used during the last antivirus scan of the object; and contents of the updated antivirus records database.

In one exemplary aspect, the antivirus setting rules include one or more of: rules for selecting antivirus scan date and time, and rules for selecting antivirus scan method.

In one exemplary aspect, a system for configuring antivirus scans comprises a hardware processor configured to: identify a software object that requires an antivirus scan; collect information for setting antivirus scan of the object; access a data store of antivirus setting rules; select a date and time for the start of the antivirus scan of the object based on the collected information and one or more antivirus setting rules; select an antivirus scan method based on the collected information, the selected date and time, and one or more antivirus setting rules; and perform an antivirus scan of the object using the selected antivirus scan method and at the selected date and time.

In one exemplary aspect, a non-transitory computer readable medium storing computer executable instructions for configuring antivirus scans, includes instructions for: identifying a software object that requires an antivirus scan; collecting information for setting antivirus scan of the object; accessing a data store of antivirus setting rules; selecting a date and time for the start of the antivirus scan of the object based on the collected information and one or more antivirus setting rules; selecting an antivirus scan method based on the collected information, the selected date and time, and one or more antivirus setting rules; and performing an antivirus scan of the object using the selected antivirus scan method and at the selected date and time.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the present invention include the features described and particularly pointed out in the claims.

BRIEF DESCRIPTION OF THE DRAWINGS

The accompanying drawings, which are incorporated into and constitute a part of this specification, illustrate one or more example aspects of the present invention and, together with the detailed description, serve to explain their principles and implementations.

FIG. 1A and FIG. 1B illustrate the order of interaction with a file by access processes and by an antivirus program during a synchronous scan.

FIG. 2A, FIG. 2B and FIG. 2C illustrate three examples of determining the date and time for the start of the antivirus scan according to one example aspect of the invention.

DESCRIPTION OF EXAMPLE ASPECTS OF THE INVENTION

Figure 3:
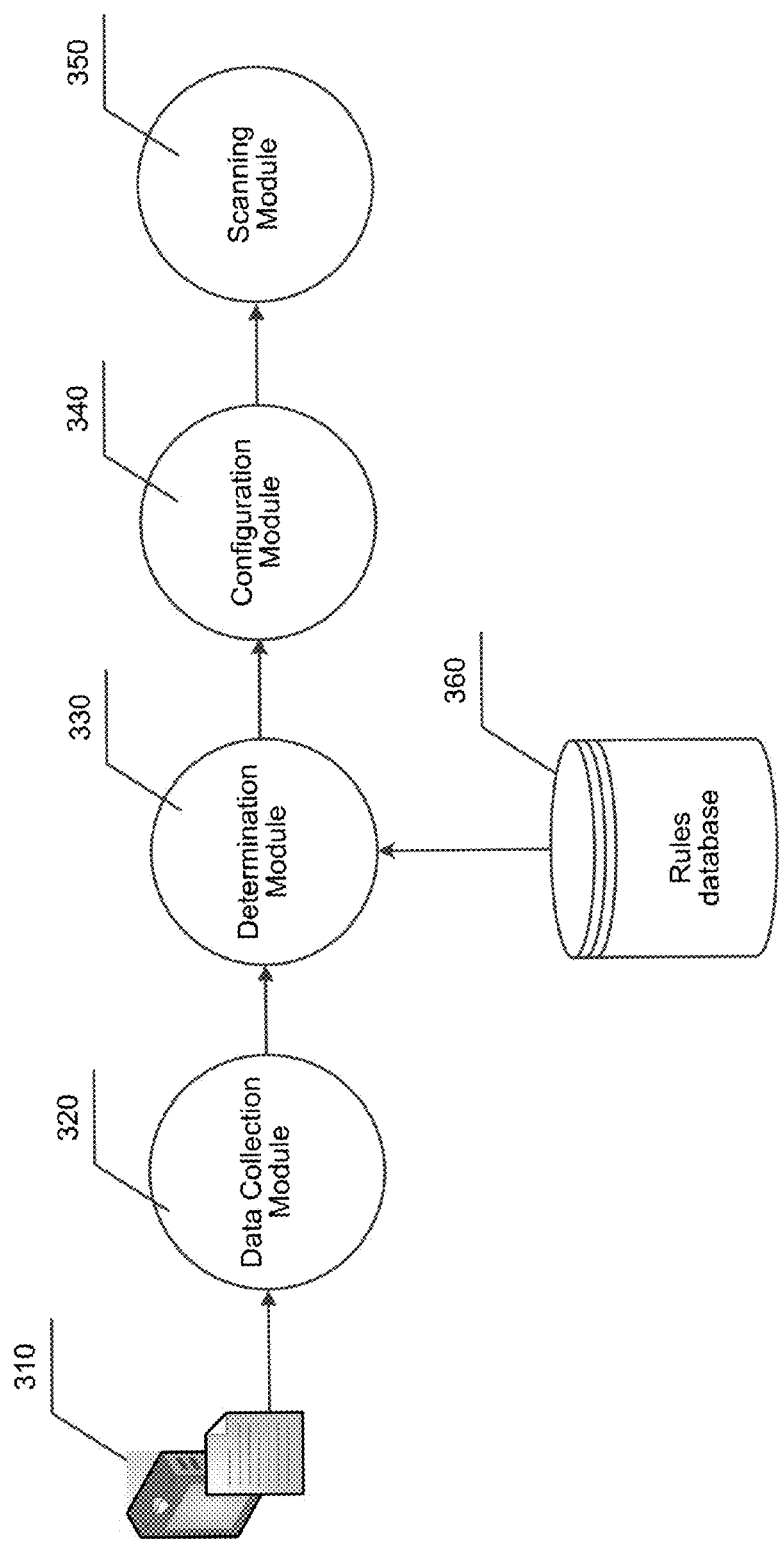
FIG. 3 illustrate an antivirus scan configuration system according to one example aspect of the invention.

Example aspects of the present invention are described herein in the context of a system, method, and computer program product for configuring antivirus scans on a computer. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Various exemplary aspects of systems and method for configuring antivirus scan of object for presence of malicious code are disclosed herein. The object may be a file, a URL, a data stream, and the like. In the following description, a file will be used as an example of the object that is being scanned by the antivirus program for presence of malicious code.

An antivirus scan is a set of actions to be executed by an antivirus program, aimed at detecting harmful activity or malicious code in the object being scanned.

An antivirus scan method is an ordered algorithm of actions on the object being scanned, its attributes, actions, and data, during the execution of which it is possible to observe or detect activity being performed by malicious code. The known antivirus scan methods, include but not limited to, signature analysis, heuristic analysis, method of detecting changes.

The antivirus scan method based on virus signatures is a method in which an antivirus program in the course of analyzing an object accesses a database of virus descriptions which may contain signatures of known malicious applications (malware signature). If a particular segment of the code of the object being analyzed matches a known malicious code (signature), the antivirus program may begin the execution of one of the following actions: remove the malicious object; send the object to "quarantine", and make an attempt to restore the object after having removed the malicious code from the object. For this method to be effective, it is necessary to periodically replenish the database of the antivirus program with new signatures.

The database of an antivirus program is a set of auxiliary data used by the antivirus program to perform the antivirus scan. The database of an antivirus program can contain descriptions of malicious applications, data on the working of the subroutines of the antivirus program, data on the files scanned, data on updates, data on vulnerabilities, data used in the course of the antivirus scan when using antivirus scan methods, and so on.

For an antivirus scan during an access attempt (On-Access Scan, OAS), especially an asynchronous and synchronous antivirus scan, and an antivirus scan on demand (On-Demand Scan, ODS), one can determine a change in the start date and time of the antivirus scan.

FIG. 2A, FIG. 2B, FIG. 2C illustrate three examples of determining the start date and time of an antivirus scan according to various aspects of the invention. Each aforementioned antivirus scan can have a start date and time (time stamp) 202. The start date and time of the antivirus scan depend directly on the moment of occurrence of the need to scan the object 201.

FIG. 2A illustrates the case when an antivirus scan is performed immediately upon access to the object. In this case, upon detecting an object for which it is necessary to perform an antivirus scan, the start date and time of the antivirus scan 202 will be as close as possible to the moment of occurrence of the need to scan the object 201.

FIG. 2B illustrates another case when a delayed antivirus scan is performed upon access to an object. In this case, the start date and time of the antivirus scan 202 occurs after a certain period of time from the moment of occurrence of the need to scan the object 201. In the majority of cases, this period cannot exceed the period of time up to the scheduled antivirus scan, but it should be other than zero. For example, the user has established in his settings a daily scan 203 at 11:00 p.m. Accordingly, the mentioned period of time will be other than zero, but will elapse by 11:00 p.m. on the particular day.

FIG. 2C illustrates a third case, when a scheduled antivirus scan is performed on demand (ODS) 203. In this case, the start date and time of the antivirus scan 202 does not depend on the moment of occurrence of the need to scan the object 201 and it coincides with the moment of the start of the scheduled antivirus scan on demand (ODS).

Situations arise where the start date and time of the antivirus scan 202 needs to be changed. For example, in the third case, a file server with antivirus program installed thereon is used, on which the administrator has configured a priority to transfer the performance of the antivirus scan of any given objects to a particular time, such as 11:00 p.m. At 7:00 p.m. an object is identified for which it is necessary to perform an antivirus scan. According to the configured priority, the start date and time of the antivirus scan 202 will occur in 4 hours. For example, at 8:00 p.m. the antivirus program performs an automatic update of the antivirus database, which contains an update of the library of descriptions of malicious applications, in particular an update involving files having the format of said identified object. It has thus become known that the activity of malicious applications acting on files of the same format as said object has increased. In this case, the need arises to designate an earlier start date and time for the antivirus scan 202, in order to perform the antivirus scan of the identified object.

Another example might be a situation in which the object for which it is necessary to perform an antivirus scan is an already scanned file. This situation also can be discussed on the basis of the third case in FIG. 2C. A user of a smartphone with an antivirus program installed thereon can schedule a weekly antivirus scan for a particular time, such as Sundays at 2:00 a.m. For example, an object for which it is necessary to perform an antivirus scan is identified at 7:00 p.m. on Tuesday. An immediate scanning of the object did not find malicious code; the object turned out to be a file of ".vbs" format. Additional data about the object was also collected after performing the antivirus scan. At 10:00 p.m. on Saturday the antivirus program performs an automatic update of the database of the antivirus program, which contains an update of the library of descriptions of malicious applications; in particular, the update does not involve files having the format ".vbs". In this case, there is no need to perform the scheduled scan, and the start date and time for the antivirus scan 202 can be scheduled for a later time.

Determination of the start date and time for an antivirus scan 202 and selection of the method of the antivirus scan are among the basic steps in the configuring of the antivirus scan. Configuring the antivirus scan is meant to optimize the process of the antivirus scan with the goal of economizing the resources of the computer system on which the antivirus program is installed, which program performs the mentioned antivirus scan. An antivirus scan configuration system is used to configure the antivirus scan.

FIG. 3 illustrates one exemplary aspect of an antivirus scan configuration system. The antivirus scan configuration system consists of a data collection module 320, a determination module 330, a configuring module 340, a scanning module 350, and a rules database 360.

The data collection module 320 is adapted to identify an object for which it is necessary to perform the antivirus scan 310.

The object for which it is necessary to perform the antivirus scan 310 can be at least one of the following listed objects:
  an object for which an access attempt has been made;
  an object which has been created or altered;
  an object for which an antivirus scan has already been performed;
  an object associated with a number of system events characteristic of malicious applications;
  an object connected with a database update of the antivirus program;
  an object associated with the utilization of known vulnerabilities in software;
  an object which has been selected by the user.

The data collection module 320 can have access to the database of vulnerabilities in software, https://web.nvd.nist.gov/. According to the information about the vulnerability CVE-2013-1325, objects of format ".wdp" present a danger. The information about the vulnerability appeared on 12 Nov. 2013. Thus, after 12 Nov. 2013 it is necessary to perform an antivirus scan for all objects of format ".wdp". And with regard to already scanned objects of format .wdp it is recommended to determine an earlier start date and time for the next antivirus scan 202.

In order to identify an object for which it is necessary to perform an antivirus scan, the data collection module 320 may analyze the log of system events, the log of scanned objects, the activity of the user, changes to the database of the antivirus program, changes to the file system, information from sites and databases associated with information protection and security, and other data and sources of information.

In one exemplary aspect, the data collection module 320 may be configured to collect data for antivirus scan configuration and for transmitting data for the antivirus scan configuration to the determination module 330.

The data for configuring the antivirus scan include at least data on the identified file and can be at least one of:
  the format of the mentioned object,
  the check sum of the mentioned object,
  the date and time of the last writing to the mentioned object,
  the type of virus threats associated with the format of the mentioned object,
  the presence of a critical vulnerability associated with the format of the mentioned object,
  the number of infections in files of the mentioned format,
  the presence of a digital signature for the mentioned object, and
  the date and time of compilation of the mentioned object, In the event that the object for which it is necessary to perform an antivirus scan 310 is an object for which an antivirus scan has already been performed, the data for configuring the antivirus scan may additionally be at least one of:
  the date and time of the antivirus scan performed for the mentioned object,
  the date and time of the last update of the database of the antivirus program by means of which the antivirus scan was performed for the mentioned object,
  the contents of the database of the antivirus program after the update.

In addition, data for configuring the antivirus scan can be collected from the database of objects or obtained from the antivirus server, if present.

In one exemplary aspect, the determination module 330 may be configured to determine the start date and time of the antivirus scan on the basis of the collected data for configuring the antivirus scan and rules for determination of the start date and time of the antivirus scan from the rules database 360, and to transmit the collected data for configuring the antivirus scan and the determined start date and time for the antivirus scan to the configuration module 340.

In one exemplary aspect, the rules database 360 may be configured to store the rules for determining the start date and time of the antivirus scan and the rules for selection of the method of the antivirus scan. Various kinds of databases can be used as the rules database 360, namely: hierarchical (IMS, TDMS, System 2000), Internet (Cerebrum, Cronospro, DBVist), relational (DB2, Informix, Microsoft SQL Server), object-oriented (Jasmine, Versant, POET), object-relational (Oracle Database, PostgreSQL, FirstSQL/J, functional, and so on. The updating of the databases can also be done with the aid of an antivirus server, if present.

In one exemplary aspect, the rule for determining the start date and time of the antivirus scan may include a set of conditions which, when fulfilled, determine the start date and time for the antivirus scan 202. The conditions taken into account during the determination can be formulated on the basis of the data for configuring the antivirus scan. An example of a rule for determining the start date and time for the antivirus scan can be the fulfillment of the following condition: the date and time of writing to the object have a later date and time than the date and time of the last antivirus scan of the object.

An example of a rule for determining the start date and time of the antivirus scan can be the following set of conditions: first of all, the format of the object which needs to be scanned is ".txt"; secondly, in the past month there have been no updates or changes to the database of the antivirus program and no threat associated with ".txt" objects has been recorded.

Yet another example of a rule for determining the start date and time of the antivirus scan can be the following set of conditions: first of all, the format of the object which needs to be scanned is ".docx"; secondly, the update of the database of the antivirus program contains an update of the descriptions of malicious applications for the detection of malicious code in ".docx" objects; thirdly, a sharp rise in the number of infections in ".docx" objects has been recorded. In this example, the start date and time of the antivirus scan should be as close as possible to the moment of occurrence of the need to scan the object. In the event that any one of the conditions is not fulfilled, such as no sharp rise recorded in the number of infections in ".docx" objects, the date and time can be earlier, such as several hours or minutes earlier.

Yet another example of a rule for determining the start date and time of an antivirus scan can be the following set of conditions: first, the format of the object which needs to be scanned is ".xlsx"; secondly, the date and time of the last writing to the object exceeds the date and time of the last update of the antivirus databases which were used in the previous antivirus scan, thirdly, the database update of the antivirus program does not contain descriptions of malicious applications associated with malicious code in ".xlsx" objects.

In one exemplary aspect, the configuration module 340 may configure the antivirus scan by selecting at least one method of antivirus scan on the basis of the collected data for configuring the antivirus scan, the determined start date and time of the antivirus scan, and the rules of selection of the method of antivirus scan from the rules database 360.

In one exemplary aspect, the rule for selection of the method of the antivirus scan may include a set of conditions which, when fulfilled, select at least one method of antivirus scan for performance of the antivirus scan. One example of a rule of selection of the antivirus scan method may be the following set of conditions: first, the start date and time of the antivirus scan are as close as possible to the moment of occurrence of the need to scan the object; second, there is no data on a previously performed antivirus scan. When these conditions are fulfilled, the configuration module 340 will select the largest available number of antivirus scan methods.

Another example of a rule of selection of the antivirus scan method may be the following set of conditions: first, the start date and time of the antivirus scan are as close as possible to the moment of occurrence of the need to scan the object; second, an antivirus scan has already been performed for the object; third, the presence of changes in the database of the antivirus program in the form of an update for the antivirus scan method. In this case, the determination module 330 will select an antivirus scan method for which updates have been added to the database of the antivirus program. The antivirus scan will be done using only the selected antivirus scan method and the new data for this method.

In one exemplary aspect, the configuration module 340 is also configured to transmit data on the configured antivirus scan to the scanning module 350.

In one exemplary aspect, the scanning module 350 is configured to perform the configured antivirus scan. The configured antivirus scan is performed when the start date and time of the antivirus scan occurs, using the selected antivirus scan method.

Figure 4:
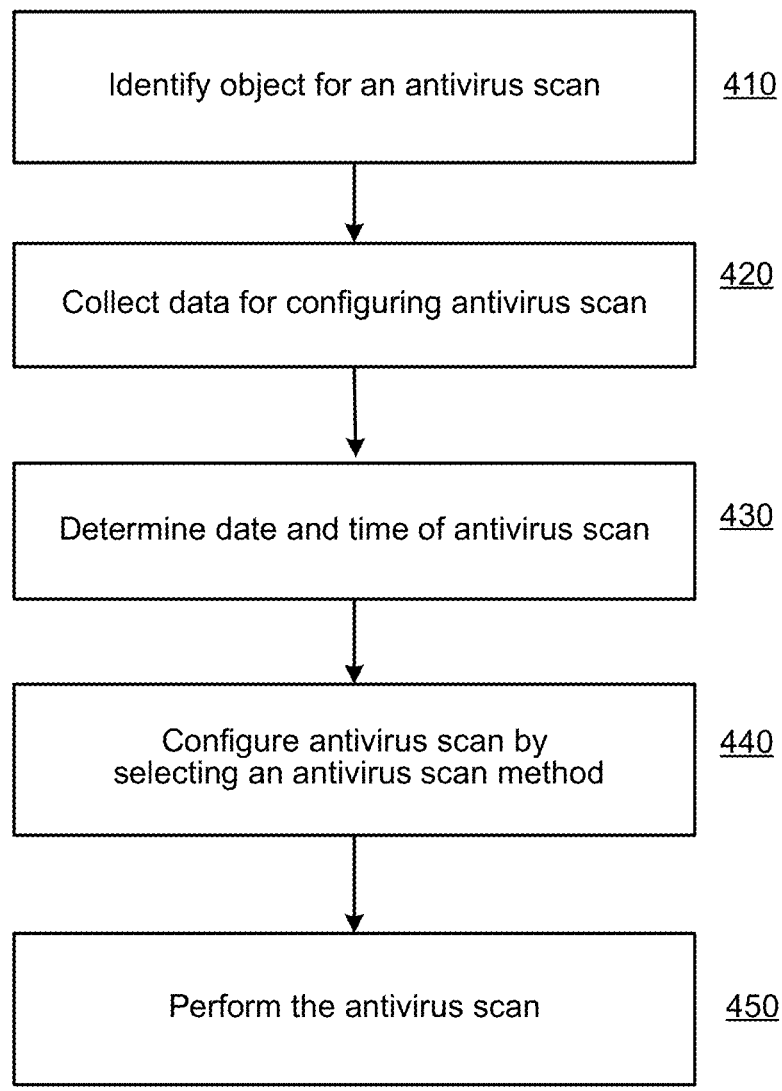
FIG. 4 illustrate an antivirus scan configuration method according to one example aspect of the invention.

FIG. 4 illustrates one exemplary aspect of antivirus scan configuration method. In step 410, the data collection module 320 identifies an object for which it is necessary to perform an antivirus scan 310. Next, in step 420, the data collection module 320 collects data for configuring the antivirus scan and transmits this to the determination module 330. In step 430, the determination module 330 determines the start date and time of the antivirus scan on the basis of the collected data for configuring the antivirus scan and rules of determination of the start date and time of the antivirus scan from the rules database 360. In step 440, the configuration module 340 configures the antivirus scan by selecting the antivirus scan method on the basis of the data collected for the configuration of the antivirus scan, the determined start date and time of the antivirus scan, and the rules for selection of the antivirus scan method from the rules database 360. Next, the configuration module 340 sends the data on the configured antivirus scan to the scanning module 350. Then, in step 450, the scanning module 350 performs the configured antivirus scan upon occurrence of the determined start date and time of the antivirus scan making use of the selected antivirus scan method.

Figure 5:
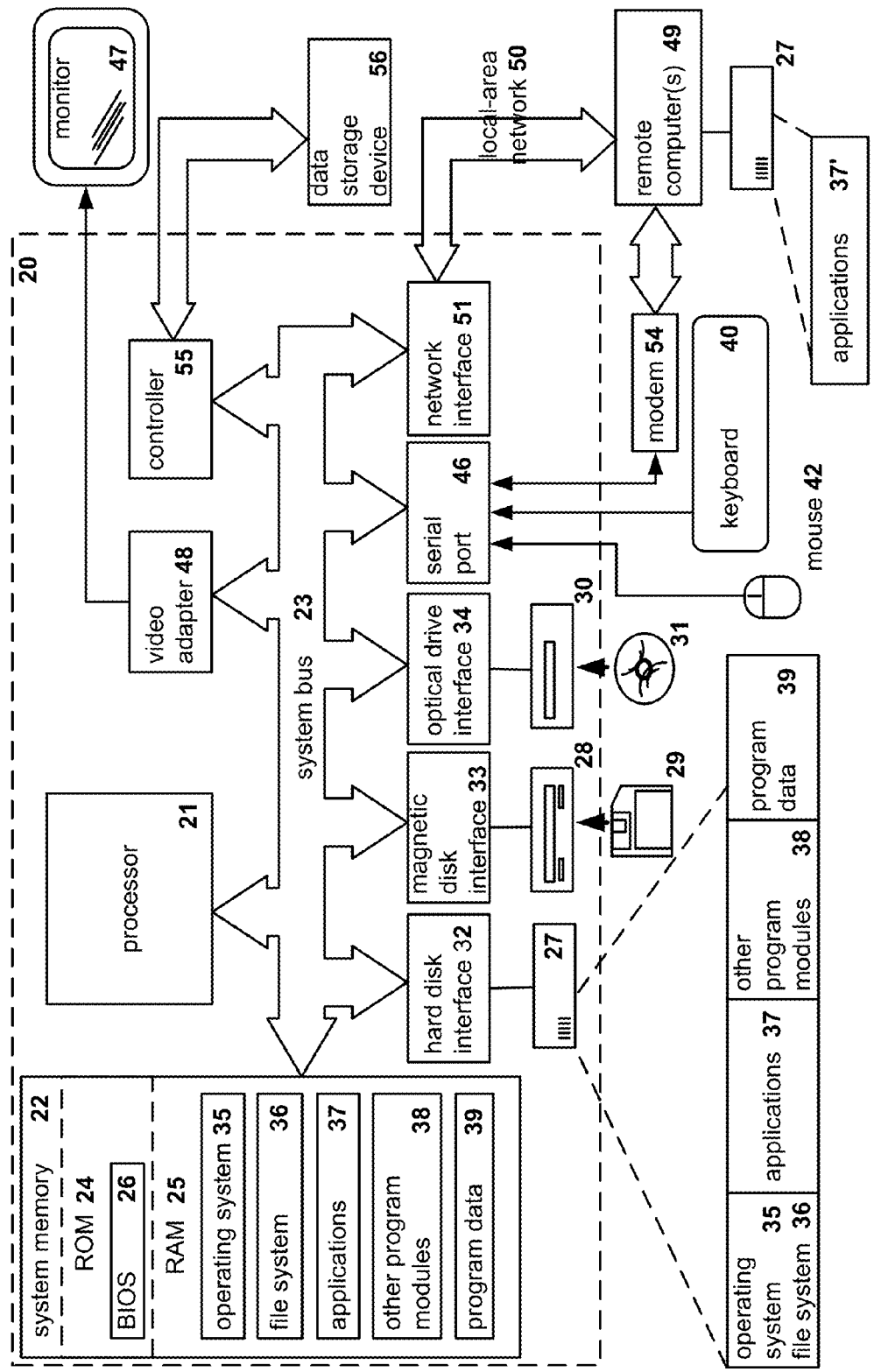
FIG. 5 illustrate an example of a general-purpose computer system in which example aspects of the systems and methods for configuring antivirus scans may be implemented.

FIG. 5 illustrates an example of a general-purpose computer system (which may be a personal computer or a server) on which the disclosed systems and method can be implemented. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 5 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for configuring antivirus scans of software objects, the method comprising:
   identifying, by a processor, a software object that requires an antivirus scan at a scheduled date and time;
   collecting, by the processor, information relating to the software object for setting the antivirus scan of the object, wherein the collected information includes an antivirus database update associated with a software object format;
   modifying, by the processor, the scheduled date and time for starting the antivirus scan of the object based on satisfaction by the collected information of at least one condition of one or more antivirus setting rules for determining a date and time for starting the antivirus scan, wherein the software object format of the collected information matches a format of the identified software object;
   selecting, by the processor, an antivirus scan method based on the collected information relating to the software object, the modified date and time, and the one or more antivirus setting rules; and
   performing, by the processor, the antivirus scan of the object using the selected antivirus scan method and at the modified date and time, wherein the modified date and time occurs earlier than the scheduled date and time.

2. The method of claim 1, wherein identifying an object that requires an antivirus scan includes identifying one or more of: an object to which an attempt to access was detected; an object that was created or modified; an object which was already subject to an antivirus scan; an object associated with one or more system events characteristic of malicious software; an object associated with an update antivirus records; an object associated with known software vulnerabilities; and an object that was selected for antivirus scanning by a user.

3. The method of claim 1, wherein collecting information for setting antivirus scan of the object includes collecting information about one or more of: format of the object; checksum of the object; date and time of creation of the object; date and time of last modification of the object; type of threats associated with that format of the object; presence of vulnerabilities associated with the format of the object; quantity of infected files of the format of the object; presence of digital signature of the object; and date and time of last compilation of the object.

4. The method of claim 1, wherein, when the object requiring antivirus scan was already subject to an antivirus scan, then collecting information for setting antivirus scan of the object includes collecting information about one or more of: date and time of the last antivirus scan of the object; date and time of the last update of the antivirus records database used during the last antivirus scan of the object; and contents of the updated antivirus records database.

5. The method of claim 1, wherein the antivirus setting rules include one or more of: rules for selecting antivirus scan date and time, and rules for selecting antivirus scan method.

6. A system for configuring antivirus scans of software objects, the system comprising:
   a memory storing a data store of one or more antivirus setting rules that each define at least one condition for a date and time for starting the antivirus scan;
   a processor configured to:
      identify a software object that requires an antivirus scan at a scheduled date and time;
      collect information relating to the software object for setting the antivirus scan of the object, wherein the collected information includes an antivirus database update associated with a software object format;
      modify the scheduled date and time for starting the antivirus scan of the object based on satisfaction by the collected information of the at least one condition of the one or more antivirus setting rules stored in the memory, wherein the software object format of the collected information matches a format of the identified software object;
      select an antivirus scan method based on the collected information relating to the software object, the modified date and time, and the one or more antivirus setting rules; and
      perform the antivirus scan of the object using the selected antivirus scan method and at the modified date and time, wherein the modified date and time occurs earlier than the scheduled date and time.

7. The system of claim 6, wherein the processor is configured to identify the software object that requires antivirus scan by identifying one or more of: an object to which an attempt to access was detected; an object that was created or modified; an object which was already subject to an antivirus scan; an object associated with one or more system events characteristic of malicious software; an object associated with an update antivirus records; an object associated with known software vulnerabilities; and an object that was selected for antivirus scanning by a user.

8. The system of claim 6, wherein the processor is configured to collect the information for setting antivirus scan of the object by collecting information about one or more of: format of the object; checksum of the object; date and time of creation of the object; date and time of last modification of the object; type of threats associated with that format of the object; presence of vulnerabilities associated with the format of the object; quantity of infected files of the format of the object; presence of digital signature of the object; and date and time of last compilation of the object.

9. The system of claim 6, wherein, when the object requiring antivirus scan was already subject to an antivirus scan, then the processor collects information for setting antivirus scan of the object by collecting information about one or more of: date and time of the last antivirus scan of the object; date and time of the last update of the antivirus records database used during the last antivirus scan of the object; and contents of the updated antivirus records database.

10. The system of claim 6, wherein the antivirus setting rules include one or more of: rules for selecting antivirus scan date and time, and rules for selecting antivirus scan method.

11. A non-transitory computer readable medium storing computer executable instructions for configuring antivirus scans of software objects, including instructions for:
    identifying a software object that requires an antivirus scan at a scheduled date and time;
    collecting information relating to the software object for setting the antivirus scan of the object, wherein the collected information includes an antivirus database update associated with a software object format;
    modifying the scheduled date and time for starting the antivirus scan of the object based on satisfaction by the collected information of at least one condition of one or more antivirus setting rules for determining a date and time for starting the antivirus scan, wherein the software object format of the collected information matches a format of the identified software object;

selecting an antivirus scan method based on the collected information relating to the software object, the modified date and time, and the one or more antivirus setting rules; and performing the antivirus scan of the object using the selected antivirus scan method and at the modified date and time, wherein the modified date and time occurs earlier than the scheduled date and time.

12. The non-transitory computer readable medium of claim 11, wherein identifying an object that requires an antivirus scan includes identifying one or more of: an object to which an attempt to access was detected; an object that was created or modified; an object which was already subject to an antivirus scan; an object associated with one or more system events characteristic of malicious software; an object associated with an update antivirus records; an object associated with known software vulnerabilities; and an object that was selected for antivirus scanning by a user.

13. The non-transitory computer readable medium of claim 11, wherein collecting information for setting antivirus scan of the object includes collecting information about one or more of: format of the object; checksum of the object; date and time of creation of the object; date and time of last modification of the object; type of threats associated with that format of the object; presence of vulnerabilities associated with the format of the object; quantity of infected files of the format of the object; presence of digital signature of the object; and date and time of last compilation of the object.

14. The non-transitory computer readable medium of claim 11, wherein, when the object requiring antivirus scan was already subject to an antivirus scan, then collecting information for setting antivirus scan of the object includes collecting information about one or more of: date and time of the last antivirus scan of the object; date and time of the last update of the antivirus records database used during the last antivirus scan of the object; and contents of the updated antivirus records database.

15. The non-transitory computer readable medium of claim 11, wherein the antivirus setting rules include one or more of: rules for selecting antivirus scan date and time, and rules for selecting antivirus scan method.

16. The method of claim 1, wherein the antivirus database update comprises an updated description of malicious application for detecting malicious code associated with the software object format, and wherein collecting the information relating to the software object comprise collecting data relating to an increase in infections related to the software object format, and wherein the at least one condition for the date and time for starting the antivirus scan is based on the data relating to the format of the object.

17. The system of claim 6, wherein the antivirus database update comprises an updated description of malicious application for detecting malicious code associated with the software object format, and wherein the processor is further configured to collect the information relating to the software object including data relating to an increase in infections related to the software object format, and to select the date and time for starting the antivirus scan of the object when the data relating to the format of the object satisfies the at least one condition of the one or more antivirus setting rules.

18. The non-transitory computer readable medium of claim 11, wherein the antivirus database update comprises an updated description of malicious application for detecting malicious code associated with the software object format, and wherein collecting the information relating to the software object comprise collecting data relating to an increase in infections related to the software object format, and wherein the at least one condition for the date and time for starting the antivirus scan is based on the data relating to the format of the object.

19. The method of claim 1, further comprising:
modifying a scheduled date and time for starting the antivirus scan of a second software object based on satisfaction by collected information related to the second software object of the antivirus setting rules specifying a date and time of writing to the second software object has a later date and time than a date and time of a previous antivirus scan of the second software object.

20. The method of claim 1, wherein
modifying a scheduled date and time for starting the antivirus scan of a second software object based on satisfaction by collected information related to the second software object of the antivirus setting rules specifying a date and time of writing to the second software object exceeds a date and time of a previous update to an antivirus database that was used during a previous antivirus scan of the second software object.

* * * * *